US012747844B2

(12) United States Patent
Kai

(10) Patent No.: US 12,747,844 B2
(45) Date of Patent: Sep. 29, 2026

(54) VEHICLE LAMP

(71) Applicant: STANLEY ELECTRIC CO., LTD., Tokyo (JP)

(72) Inventor: Fumio Kai, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/399,071

(22) Filed: Nov. 24, 2025

(65) Prior Publication Data

US 2026/0153212 A1 Jun. 4, 2026

(30) Foreign Application Priority Data

Nov. 29, 2024 (JP) ................................ 2024-208581

(51) Int. Cl.
*F21S 43/241* (2018.01)
*F21S 43/242* (2018.01)
*F21S 43/249* (2018.01)

(52) U.S. Cl.
CPC ........... *F21S 43/241* (2018.01); *F21S 43/246* (2024.05); *F21S 43/249* (2018.01)

(58) Field of Classification Search
CPC ....... F21S 43/241; F21S 43/246; F21S 43/249
See application file for complete search history.

(56) References Cited

U.S. PATENT DOCUMENTS 11,079,087 B2 * 8/2021 Ichinohe ................ F21S 43/14
12,320,483 B2 * 6/2025 Otsuka .................... F21S 41/24
2012/0250343 A1 * 10/2012 Koizumi .............. F21S 43/243 362/511
2015/0277027 A1 * 10/2015 Koizumi .............. F21S 43/247 362/511
2023/0324021 A1 * 10/2023 Hashiba ............... F21S 43/239 362/511

FOREIGN PATENT DOCUMENTS

JP 2022-117917 A 8/2022

* cited by examiner

*Primary Examiner* — Tsion Tumebo
(74) *Attorney, Agent, or Firm* — Kenealy Vaidya LLP

(57) ABSTRACT

A vehicle lamp includes a first-light-source provided on one side in first-direction, a second-light-source provided on other side in the first-direction, a first light-guide-body provided on a side facing the first-light-source and the second-light-source, and a second light-guide-body provided on a side opposite to the side of the first light-guide-body facing the first-light-source and the second-light-source. The first light-guide-body has a first light-guide-portion extending in the first-direction and a second light-guide-portion extending from one end side of the first light-guide-portion toward the other side in second-direction. The second light-guide-body has third incidence-portion positioned on a side facing the first light-guide-portion and configured to cause third light leaking from the first light-guide-portion to enter inside of the second light-guide-body and third emission-portion positioned on a side opposite to the third incidence-portion and configured to emit the third light entered from the third incidence-portion to outer side of the second light-guide-body.

9 Claims, 8 Drawing Sheets

VEHICLE LAMP

CROSS-REFERENCE TO RELATED APPLICATION

Priority is claimed on Japanese Patent Application No. 2024-208581, filed Nov. 29, 2024, the content of which is incorporated herein by reference.

BACKGROUND OF THE INVENTION

Field of the Invention

The present invention relates to a vehicle lamp.

Description of Related Art

Conventionally, as a vehicle lamp mounted on a vehicle, a vehicle lamp in which a light source such as a light-emitting diode (LED) and a light guide body such as an inner lens are combined is known (for example, see Japanese Unexamined Patent Application, First Publication No. 2022-117917).

In such a vehicle lamp, light emitted from a light source enters an inner side of a light guide body from an incident surface of the light guide body, the light is guided at inside the light guide body and the light is emitted from an emission surface of the light guide body to an outside of the light guide body. Thereby, the emission surface of the light guide body can emit light as a light emission surface of the vehicle lamp.

Moreover, technology described in Japanese Unexamined Patent Application, First Publication No. 2022-117917 is known. In a lamp module described in Japanese Unexamined Patent Application, First Publication No. 2022-117917, a configuration in which a first light source is arranged in a rear direction of a light guide portion so that the first light source faces a rear surface portion of the light guide portion, and a second light source is arranged below the light guide portion so that the second light source faces a lower surface portion of the light guide portion, and a single light emission surface is shared is employed.

SUMMARY OF THE INVENTION

In the above-described conventional technology, a configuration in which a single light emission surface is shared is employed, on the other hand, a configuration in which a light emission range is actively expanded is not employed. Because there is a possibility that light will be dispersed and an intensity of light will decrease when an attempt is made to expand the light emission range, there remains room for improvement.

An aspect of the present invention provides a vehicle lamp capable of expanding a light emission range and enhancing an intensity of light emission.

An aspect of the present invention provides the following configuration:

[1] A vehicle lamp including:

a first light source that is provided on one side in a first direction and that is configured to emit first light toward other side in a second direction which intersects the first direction;

a second light source that is provided on other side in the first direction and that is configured to emit second light toward the other side in the second direction;

a first light guide body provided on a side facing the first light source and the second light source; and a second light guide body provided on a side opposite to the side of the first light guide body facing the first light source and the second light source, wherein the first light guide body includes:

a first light guide portion extending in the first direction;

a second light guide portion extending from one end side of the first light guide portion toward the other side in the second direction;

a first incidence portion that is positioned on a side of the first light guide portion which faces the first light source and that is configured to cause the first light emitted from the first light source to enter inside of the first light guide portion;

a second incidence portion that is positioned on a side of the first light guide portion which faces the second light source and that is configured to cause the second light emitted from the second light source to enter inside of the first light guide portion;

a first reflection portion that is positioned on a side of the first light guide portion which is opposite to the first incidence portion and that is configured to reflect a part of the first light which has entered from the first incidence portion toward the other end side of the first light guide portion;

a second reflection portion that is positioned on the side of the first light guide portion which is opposite to the first incidence portion and that is configured to reflect a part of the first light which has entered from the first incidence portion toward the one end side of the first light guide portion;

a third reflection portion that is positioned on the one end side of the first light guide portion and that is configured to reflect the first light reflected by the second reflection portion toward the second light guide portion;

a fourth reflection portion that is positioned on one side of the second light guide portion in the first direction and that is configured to reflect the first light which is guided inside the second light guide portion toward the other side in the first direction;

a first emission portion that is positioned on a side of the second light guide portion which is opposite to the fourth reflection portion and that is configured to emit the first light reflected by the fourth reflection portion to an outer side of the second light guide portion;

a fifth reflection portion that is positioned on a side of the first light guide portion which is opposite to the second incidence portion and that is configured to reflect the second light entered from the second incidence portion toward the other end side of the first light guide portion; and a second emission portion that is positioned on the other end side of the first light guide portion and that is configured to emit the second light reflected by the fifth reflection portion and the first light reflected by the first reflection portion to an outer side of the first light guide portion, and wherein the second light guide body includes:

a third incidence portion that is positioned on a side facing the first light guide portion and that is configured to cause third light leaked from the first light guide portion to enter inside of the second light guide body; and a third emission portion that is positioned on a side opposite to the third incidence portion and that is configured to emit the third light entered from the third incidence portion to an outer side of the second light guide body.

[2] The vehicle lamp according to the above-described aspect [1], further including a third light guide body provided on a side facing the first emission portion and the second emission portion, wherein the third light guide body includes:

a first light emission range in which light emission is performed by the first light emitted from the first emission portion and the third light emitted from the third emission portion; and a second light emission range in which light emission is performed by the second light emitted from the second emission portion and the first light, and wherein the first light emission range and the second light emission range form a light emission range continuous in the second direction.

[3] In the vehicle lamp according to the above-described aspect [1], wherein the second light guide body is arranged inside a recess portion provided on a side opposite to the side facing the first light source and the second light source of the first light guide body.

[4] In the vehicle lamp according to the above-described aspect [1], the third incidence portion is provided facing at least a space between the first reflection portion and the second reflection portion of the first light guide portion.

[5] In the vehicle lamp according to the above-described aspect [4], the second light guide body includes:

a sixth reflection portion that is positioned on a side opposite to the third incidence portion and on one side of the third emission portion in the first direction and that is configured to reflect the third light entered from the third incidence portion toward the other side in the first direction; and a seventh reflection portion that is positioned on the side facing the first light guide portion and on the other side in the first direction than the third incidence portion and that is configured to reflect the third light reflected by the sixth reflection portion toward the third emission portion.

[6] In the vehicle lamp according to the above-described aspect [1], the second light guide portion has a shape in which one surface where the fourth reflection portion is provided is inclined toward the other side in the first direction and the other surface where the first emission portion is provided is inclined toward one side in the first direction.

[7] In the vehicle lamp according to the above-described aspect [1], the first incidence portion and the second incidence portion have lens shapes in which the first light and the second light emitted from the first light source and the second light source enter the inside of the first light guide portion while condensing the first light and the second light emitted from the first light source and the second light source toward an optical axis.

[8] In the vehicle lamp according to the above-described aspect [1], the first reflection portion, the second reflection portion, the third reflection portion, and the fifth reflection portion include inclined surfaces, and the fourth reflection portion includes a plurality of reflection cuts.

[9] In the vehicle lamp according to the above-described aspect [5], the sixth reflection portion includes an inclined surface, and the seventh reflection portion includes a plurality of reflection cuts.

According to an aspect of the present invention, a vehicle lamp capable of expanding a light emission range and enhancing an intensity of light emission is provided.

BRIEF DESCRIPTION OF THE DRAWINGS

FIG. 4 is a sectional view showing a state of the vehicle lamp shown in FIG. 3 when a tail lamp is turned on.

FIG. 5 is a sectional view showing a state of the vehicle lamp shown in FIG. 3 when a stop lamp is turned on.

DETAILED DESCRIPTION OF THE INVENTION

Figure 1:
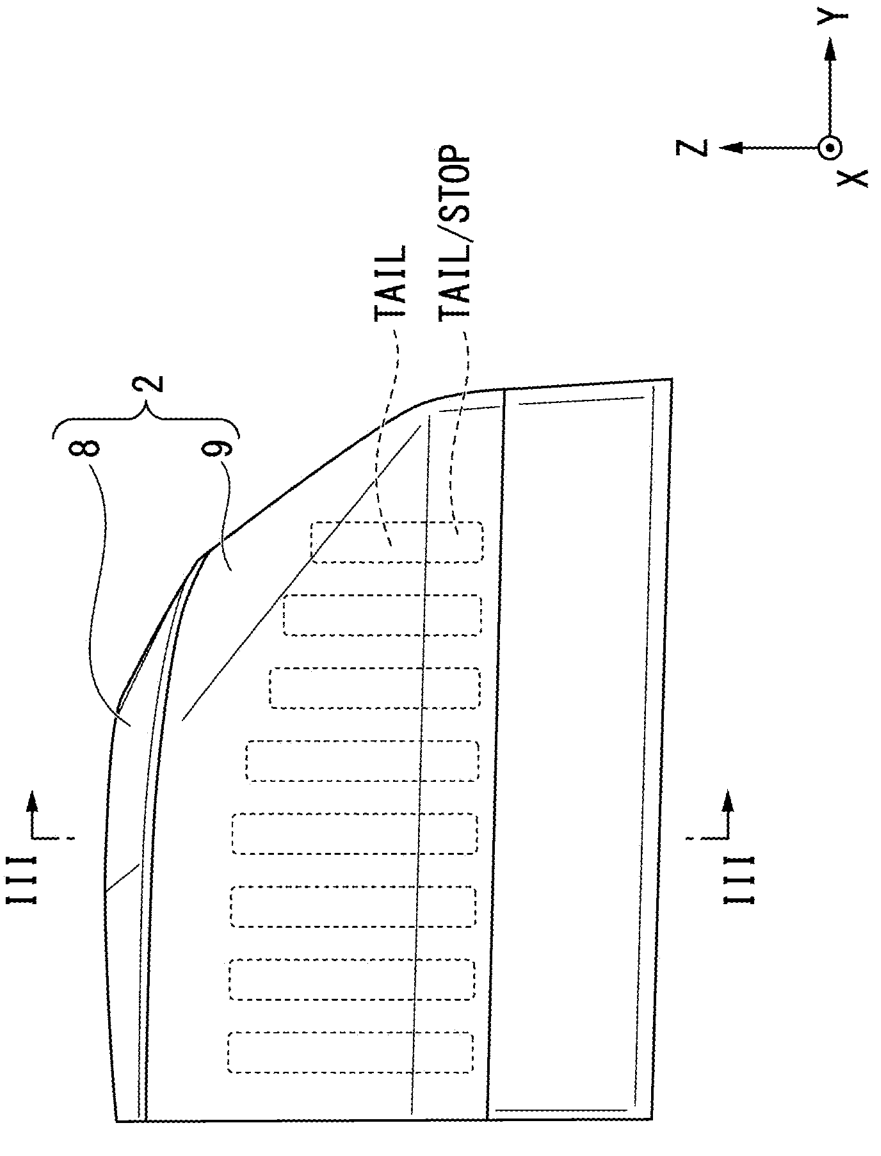
FIG. 1 is a front view showing a vehicle lamp according to an embodiment of the present invention.

Hereinafter, embodiments of the present invention will be described in detail with reference to the drawings.

In the drawings used in the following description, dimensions of constituent elements may be shown with different scales for ease of understanding, and dimensional ratios of the respective constituent elements are not necessarily the same as in reality.

As an embodiment of the present invention, a vehicle lamp 1 shown in FIGS. 1 to 8 will be described.

Figure 2:
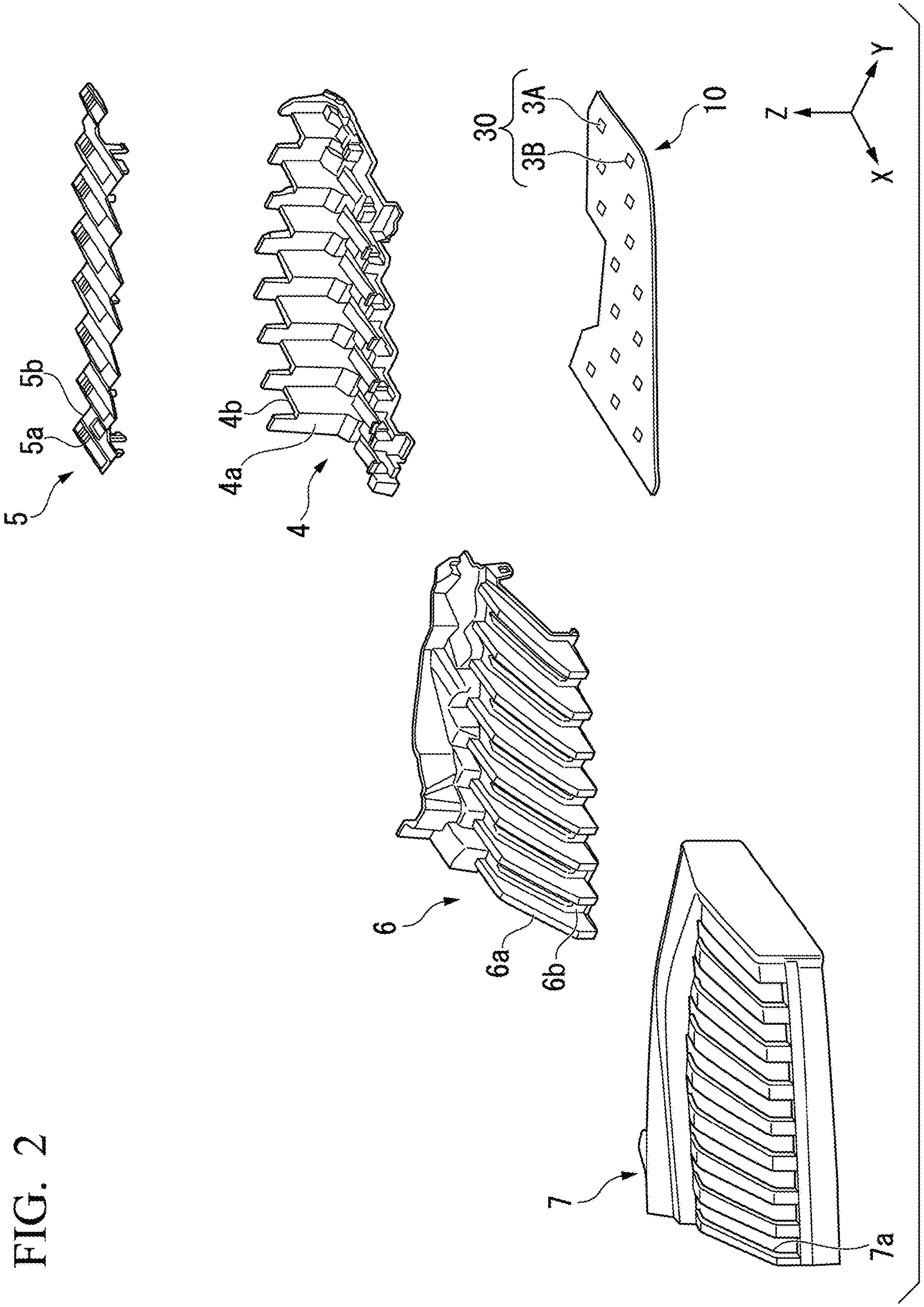
FIG. 2 is an exploded perspective view of the vehicle lamp shown in FIG. 1.
Figure 3:
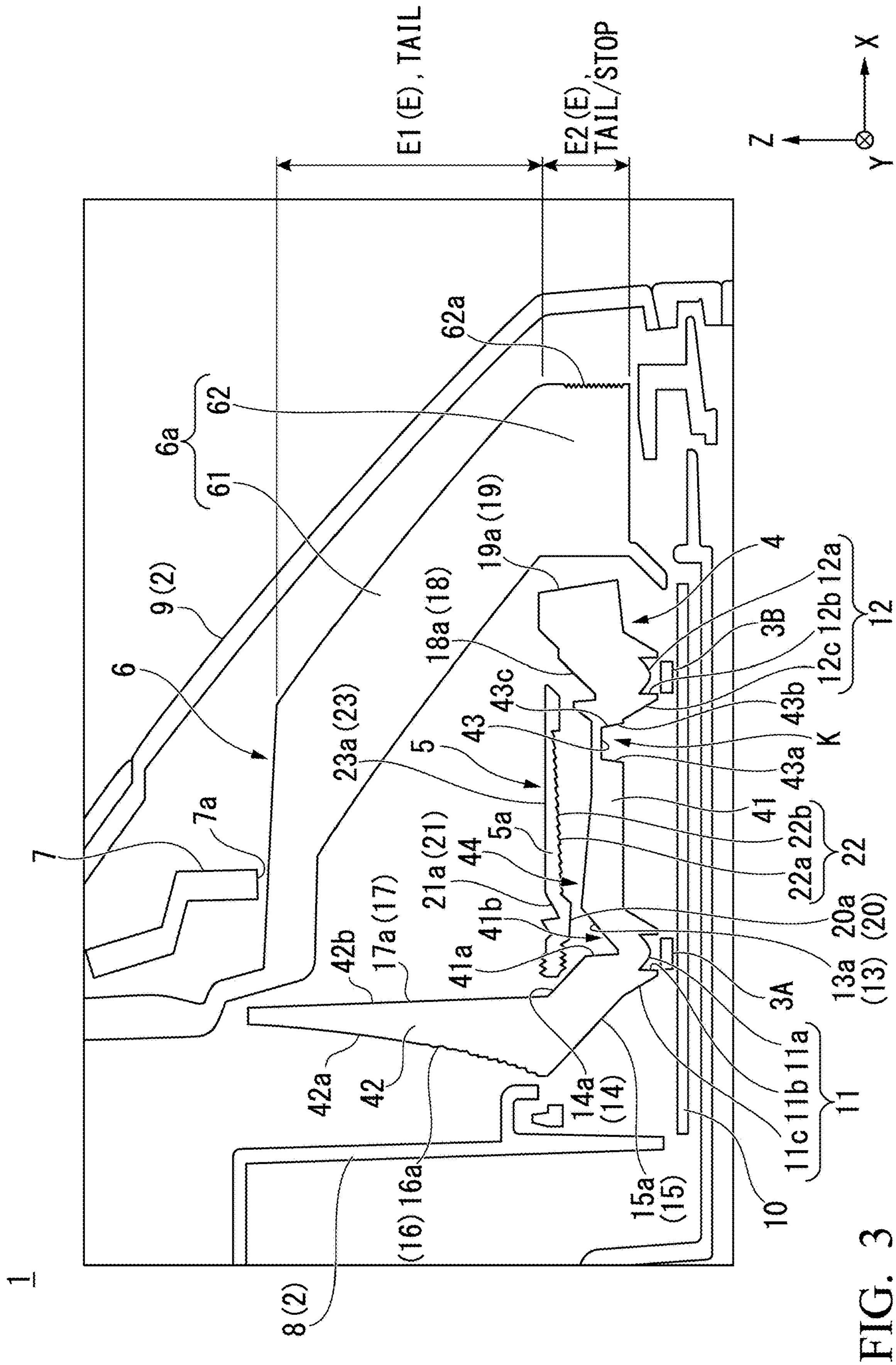
FIG. 3 is a sectional view of the vehicle lamp taken along line III-III in FIG. 1.
Figure 4:
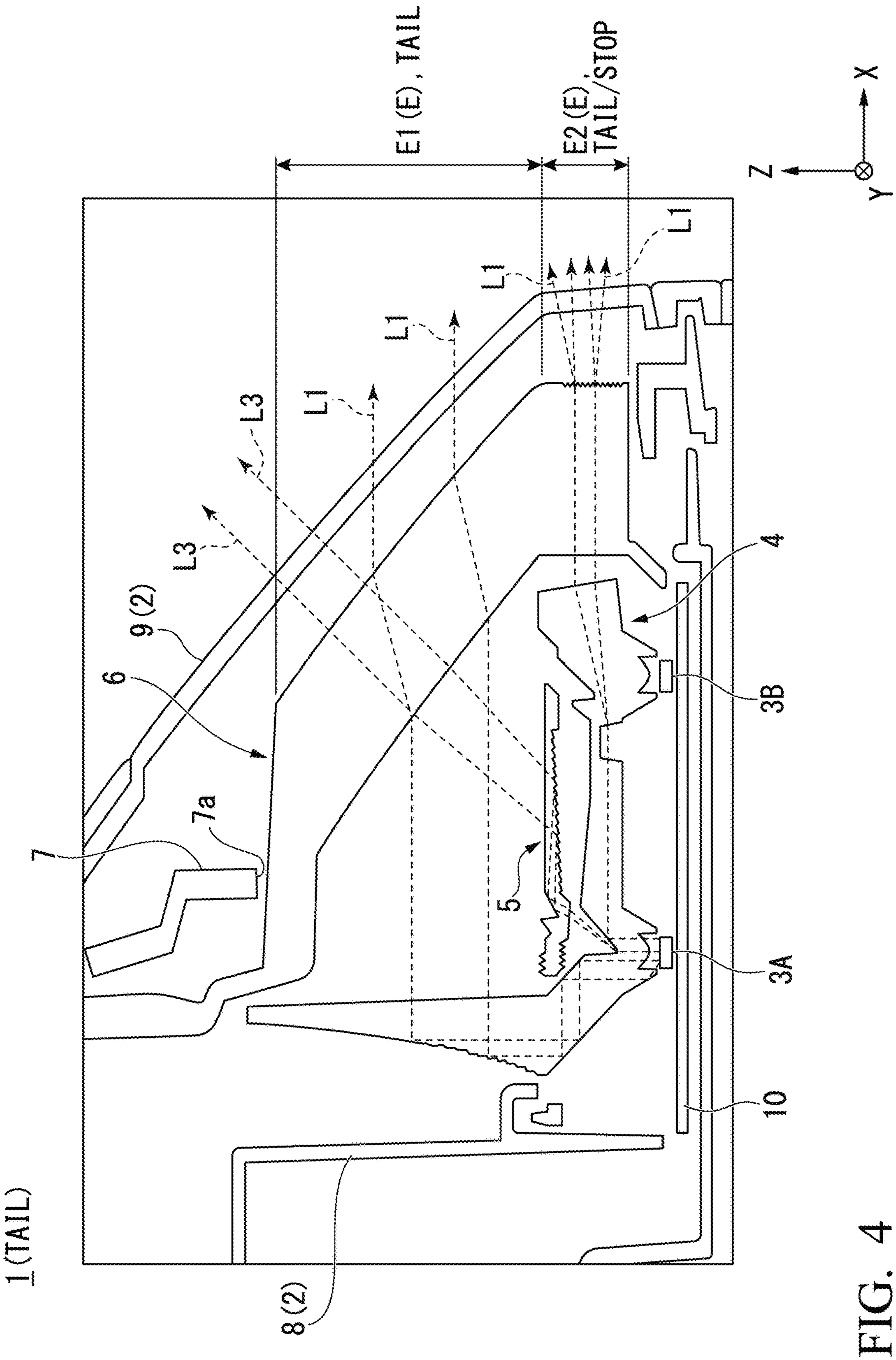
Figure 5:
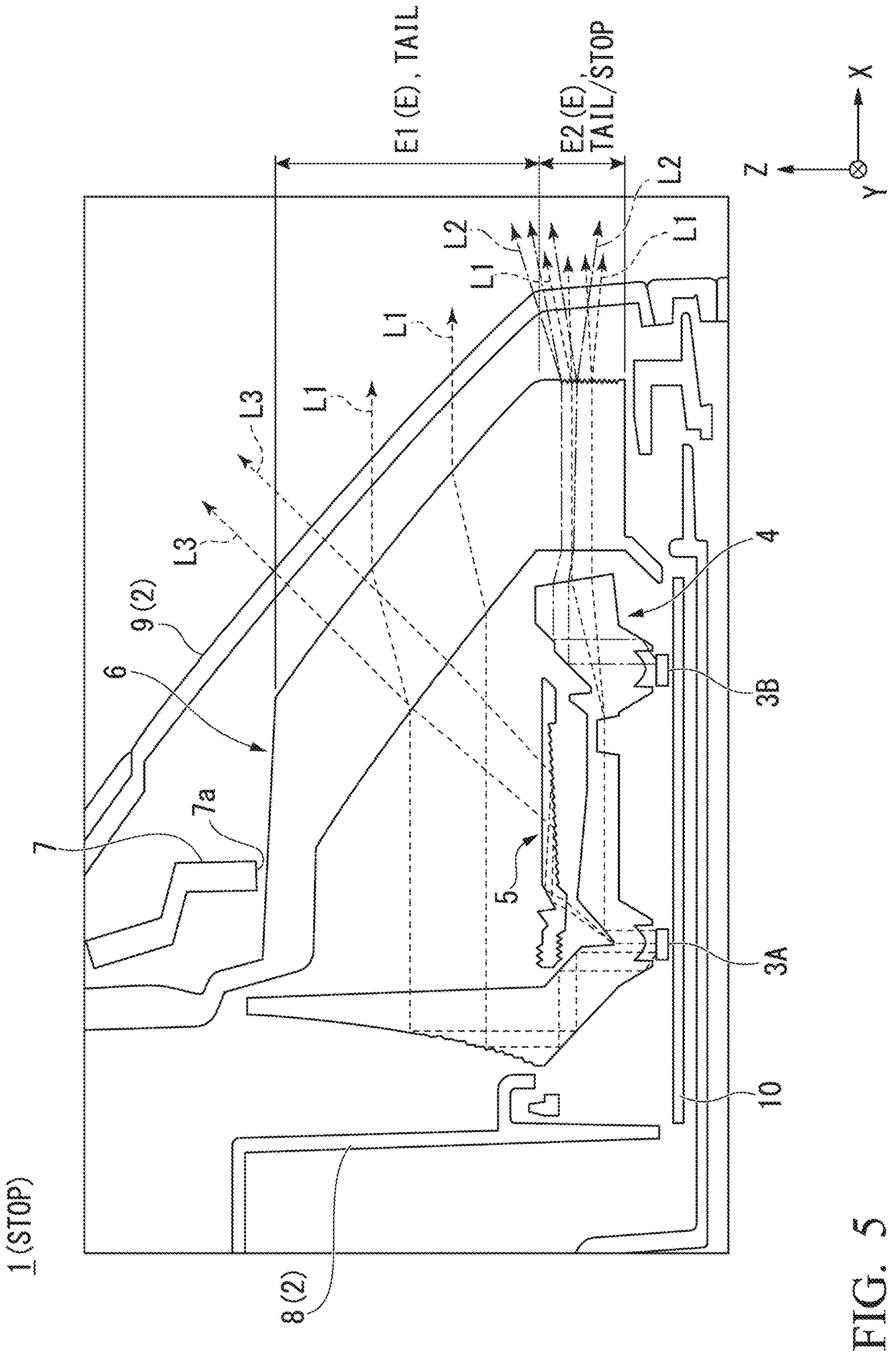
Figure 6:
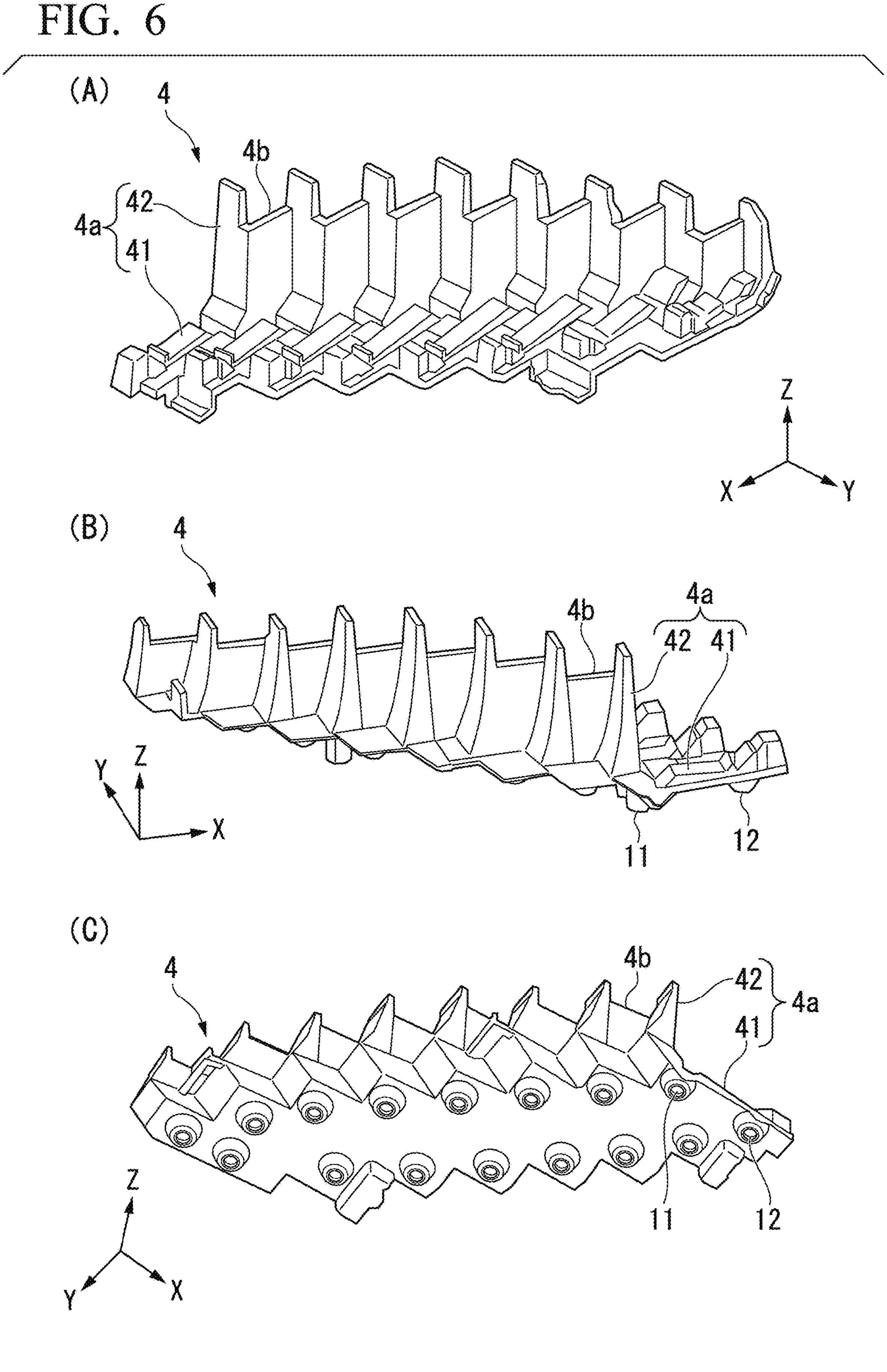
FIG. 6 shows a first inner lens shown in FIG. 2, wherein part (A) is a perspective view seen from a front side of the first inner lens, part (B) is a perspective view seen from a rear side of the first inner lens, and part (C) is a perspective view seen from a lower side of the first inner lens.
Figure 7:
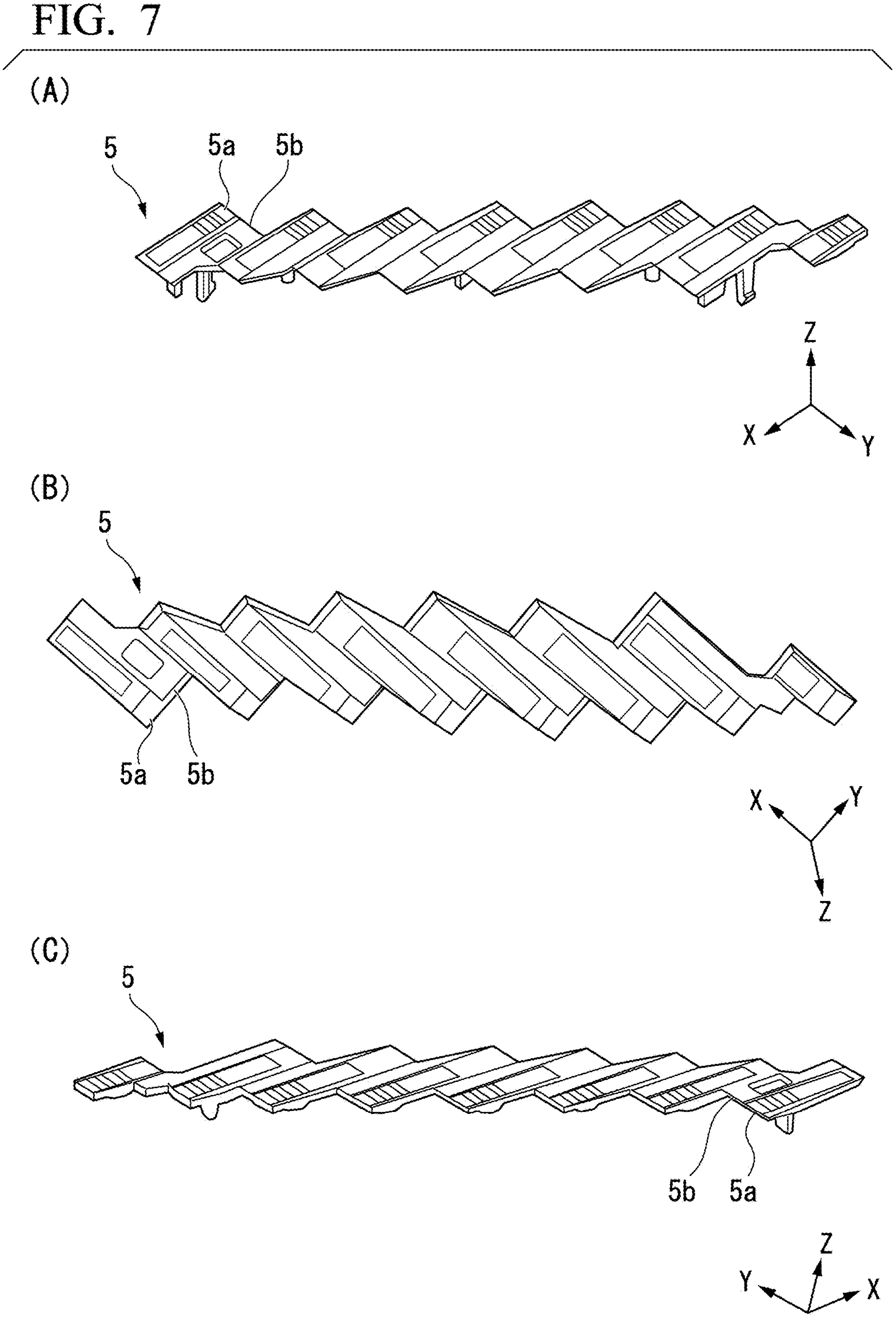
FIG. 7 shows a second inner lens shown in FIG. 2, wherein part (A) is a perspective view seen from a front side of the second inner lens, part (B) is a perspective view seen from a rear side of the second inner lens, and part (C) is a perspective view seen from a lower side of the second inner lens.
Figure 8:
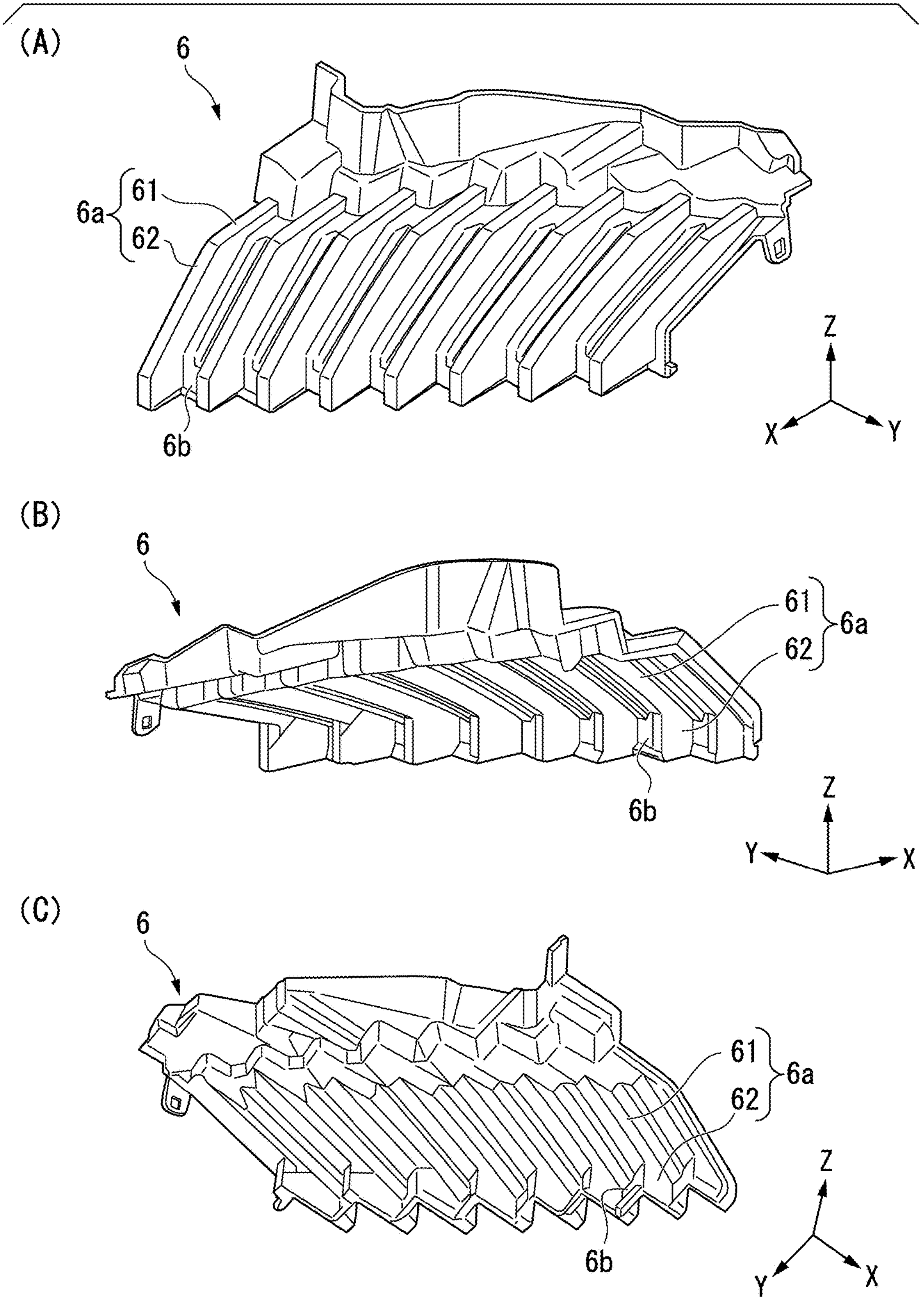
FIG. 8 shows a third inner lens shown in FIG. 2, wherein part (A) is a perspective view seen from a front side of the third inner lens, part (B) is a perspective view seen from a rear side of the third inner lens, and part (C) is a perspective view seen from a lower side of the third inner lens.

FIG. 1 is a front view showing the vehicle lamp 1. FIG. 2 is an exploded perspective view of the vehicle lamp 1. FIG. 3 is a sectional view of the vehicle lamp 1 taken along line III-III shown in FIG. 1. FIG. 4 is a sectional view showing a state of the vehicle lamp 1 when a tail lamp TAIL is turned on. FIG. 5 is a sectional view showing a state of the vehicle lamp 1 when a stop lamp STOP is turned on. FIG. 6 shows a first inner lens 4, wherein part (A) is a perspective view seen from a front side of the first inner lens 4, part (B) is a perspective view seen from a rear side of the first inner lens 4, and part (C) is a perspective view seen from a lower side of the first inner lens 4. FIG. 7 shows a second inner lens 5, wherein part (A) is a perspective view seen from a front side of the second inner lens 5, part (B) is a perspective view seen from a rear side of the second inner lens 5, and part (C) is a perspective view seen from a lower side of the second inner lens 5. FIG. 8 shows a third inner lens 6, wherein part (A) is a perspective view seen from a front side of the third inner lens 6, part (B) is a perspective view seen from a rear side of the third inner lens 6, and part (C) is a perspective view seen from a lower side of the third inner lens 6.

Moreover, in the drawings shown below, an XYZ orthogonal coordinate system is defined so that an X-axis direction represents a front-rear direction (length direction) of the vehicle, a Y-axis direction represents a left-right direction (width direction) of the vehicle, and a Z-axis direction represents an up-down direction (height direction) of the vehicle.

As shown in FIG. 1, the vehicle lamp 1 of the present embodiment constitutes the tail lamp TAIL that emits red light, and the stop lamp STOP that emits red light more strongly (brighter) than the tail lamp TAIL when the vehicle (not shown) is braked among rear combination lamps (RCLs) mounted on both corner portions on a rear end side (a corner portion on a right rear end side in the present embodiment) of the vehicle. Accordingly, the front-rear direction of the vehicle lamp 1 when the vehicle lamp 1 is viewed from the front side (in the rear direction of the vehicle) is opposite to that when the vehicle is viewed from the front side (in the front direction of the vehicle).

Moreover, in the present embodiment, a first direction is the front-rear direction (X-axis direction) of the vehicle, one side in the first direction corresponds to the front side (front direction) of the vehicle, and the other side in the first direction corresponds to the rear side (rear direction) of the vehicle. A second direction is the up-down direction (Z-axis direction) of the vehicle lamp 1, which is orthogonal to the first direction, one side in the second direction corresponds to the lower side (down direction) of the vehicle, and the other side in the second direction corresponds to the upper side (up direction) of the vehicle. A third direction is the left-right direction (Y-axis direction) of the vehicle, which is orthogonal to both the first direction and the second direction, one side in the third direction corresponds to the left side (left direction) of the vehicle, and the other side in the third direction corresponds to the right side (right direction) of the vehicle.

As shown in FIGS. 2 to 5, the vehicle lamp 1 of the present embodiment has a structure in which a first inner lens (first light guide body) 4, a second inner lens (second light guide body) 5, a plurality of first light sources 3A, a plurality of second light sources 3B, a third inner lens (third light guide body) 6, and an extension 7 are arranged inside a lamp body 2.

The lamp body 2 includes a housing 8 having a front opening and a transparent outer lens 9 configured to cover the opening of the housing 8. Moreover, in the vehicle lamp 1 viewed from the rear side of the vehicle, the outer lens 9 has a shape curved toward the front side of the vehicle from the left side to the right side in the left-right direction corresponding to a slant shape given to a corner portion on the rear end side of the vehicle. In addition, the shape of the lamp body 2 can be suitably modified in accordance with the design of the vehicle and the like.

The plurality of first light sources 3A include LEDs that emit red light (hereinafter referred to as "first light") L1 as tail lamp light sources. The plurality of second light sources 3B include LEDs that emit red light (hereinafter referred to as "second light") L2 as stop lamp light sources.

The plurality of first light sources 3A and the plurality of second light sources 3B are mounted on one surface (the upper surface in the present embodiment) of a circuit board 10 where a drive circuit for driving the plurality of light sources 3A and 3B is provided. That is, the plurality of light sources 3A and 3B are provided on the same surface of the same circuit board 10 and are configured to emit the light L1 and L2 in the same direction. The circuit board 10 is arranged below the first inner lens 4.

Moreover, the first light source 3A and the second light source 3B together constitute one set of light source portions 30 arranged next to each other in the front-rear direction. Among them, the first light source 3A is positioned on the front side of the circuit board 10, and the second light source 3B is positioned on the rear side of the circuit board 10.

Moreover, a plurality of light source portions 30 are aligned and arranged in the left-right direction of the circuit board 10. In the vehicle lamp 1 viewed from the rear of the vehicle, for each light source portion 30, the first light sources 3A and the second light sources 3B are arranged to be located in more front side of the vehicle as it goes from the left side to the right side in the left-right direction.

Thereby, the first light sources 3A and the second light sources 3B constituting the light source portions 30 radially emit the first light L1 and the second light L2 toward the first inner lens 4 located above the circuit board 10.

As shown in FIGS. 2 to 5 and FIG. 6, the first inner lens 4, for example, is made of a light-transmissive member such as glass or transparent resin of polycarbonate, acrylic, or the like. The first inner lens 4 is arranged, as the first light guide body, on a side facing the plurality of first light sources 3A and the plurality of second light sources 3B, i.e., above the circuit board 10.

The first inner lens 4 has a plurality of light guide portions 4*a* arranged in the left-right direction in correspondence with the above-described light source portions 30 and a plurality of connection portions 4*b* configured to establish connections between adjacent light guide portions 4*a*. Moreover, in the vehicle lamp 1 viewed from the rear side of the vehicle, the plurality of light guide portions 4*a* are arranged to be located in more front side of the vehicle as it goes from the left side to the right side in the left-right direction for each light source portion 30. The plurality of connection portions 4*b* establish the connections between the adjacent light guide portions 4*a*.

Each light guide portion 4*a* includes a first light guide portion 41 and a second light guide portion 42. The first light guide portion 41 extends from the front end side of the first inner lens 4 to the rear end side of the first inner lens 4. The second light guide portion 42 extends upward from one end side of the first light guide portion 41.

Moreover, the second light guide portion 42 has a shape in which its rear surface (one surface) 42*a* is inclined rearward as it extends upward and in which its front surface (the other surface) 42*b* is inclined forward as it extends upward. Thereby, it is possible to easily release the second light guide portion 42 from the mold used for molding the first inner lens 4.

The first inner lens 4 has, for each light guide portion 4*a*, a first incidence portion 11 positioned on the lower side of the first light guide portion 41, a second incidence portion 12 positioned on the lower side of the first light guide portion 41, a first reflection portion 13 and a second reflection portion 14 positioned on the upper side of the first light guide portion 41, a third reflection portion 15 positioned on the front end side of the first light guide portion 41, a fourth reflection portion 16 positioned on the rear surface 42*a* side of the second light guide portion 42, a first emission portion 17 positioned on the front surface 42*b* side of the second light guide portion 42, a fifth reflection portion 18 positioned on the upper side of the first light guide portion 41 and the rear side of the first reflection portion 13 and the second reflection portion 14, a second emission portion 19 positioned on the rear end side of the first light guide portion 41, and a connection surface 41*a* configured to connect the first reflection portion 13 and the second reflection portion 14 of the first light guide portion 41.

The first incidence portion 11 is positioned on the side facing the first light source 3A of the first light guide portion 41 and has a lens shape in which the first light L1 emitted from the first light source 3A enters the inner side of the first light guide portion 41 while being condensed toward the optical axis.

Specifically, the first incidence portion 11 includes: a first condensing incident surface 11*a* that is positioned on a center side of a portion facing the first light source 3A and that is convexly curved toward the first light source 3A side; an approximately frustoconical second condensing incident surface 11*b* that is positioned on an outer circumferential side of the first condensing incident surface 11*a* and that is inclined to gradually increase in diameter toward the first light source 3A side from a position where it is surrounding the circumference of the first condensing incident surface 11*a*; and an approximately frustoconical condensing reflection surface 11*c* that is positioned on an outer circumferential side of the second condensing incident surface 11*b* and that is inclined to gradually increase in diameter toward a side opposite to the first light source 3A from a position where it is surrounding the circumference of the second condensing incident surface 11*b*.

In the first incidence portion 11, the first light L1 entered the inner side of the first light guide portion 41 from the first condensing incident surface 11*a* among the first light L1 emitted from the first light source 3A is condensed toward the optical axis. On the other hand, the first light L1 entered the inner side of the first light guide portion 41 from the second condensing incident surface 11*b* is reflected by the condensing reflection surface 11*c* and condensed toward the optical axis.

Thereby, in the first incidence portion 11, the first light L1 emitted radially from the first light source 3A enters the inner side of the first light guide portion 41 while being collimated. The first light L1 entered from the first incidence portion 11 is guided toward the first reflection portion 13 and the second reflection portion 14 in the up direction inside the first light guide portion 41.

The second incidence portion 12 is positioned on the side of the first light guide portion 41 facing the second light source 3B and has a lens shape in which the second light L2 emitted from the second light source 3B enters the inner side of the first light guide portion 41 while being condensed toward the optical axis.

Specifically, the second incidence portion 12 includes: a first condensing incident surface 12*a* that is positioned on a center side of a portion facing the second light source 3B and that is convexly curved toward the second light source 3B side; an approximately frustoconical second condensing incident surface 12*b* that is positioned on an outer circumferential side of the first condensing incident surface 12*a* and that is inclined to gradually increase in diameter toward the second light source 3B side from a position where it is surrounding the circumference of the first condensing incident surface 12*a*; and an approximately frustoconical condensing reflection surface 12*c* that is positioned on an outer circumferential side of the second condensing incident surface 12*b* and that is inclined to gradually increase in diameter toward the side opposite to the second light source 3B from a position where it is surrounding the circumference of the second condensing incident surface 12*b*.

In the second incidence portion 12, among the second light L2 emitted from the second light source 3B, the second light L2 which has entered the inner side of the first light guide portion 41 from the first condensing incident surface 12*a* is condensed toward the optical axis. On the other hand, the second light L2 which has entered the inner side of the first light guide portion 41 from the second condensing incident surface 12*b* is reflected by the condensing reflection surface 12*c* and condensed toward the optical axis.

Thereby, in the second incidence portion 12, the second light L2 emitted radially from the second light source 3B enters the inner side of the first light guide portion 41 while being collimated. The second light L2 entered from the second incidence portion 12 is guided toward the fifth reflection portion 18 in the up direction inside the first light guide portion 41.

The first reflection portion 13 is positioned on the side of the first light guide portion 41 opposite to the first incidence portion 11 and has a first reflection surface 13*a* configured to reflect a part of the first light L1 entered from the first incidence portion 11 toward the rear end side of the first light guide portion 41. The first reflection surface 13*a* includes a flat inclined surface that inclines upward toward the rear side of the first light guide portion 41.

In the first reflection portion 13, a part of the first light L1 incident on the first reflection surface 13*a* is reflected toward the rear end side of the first light guide portion 41. The first light L1 reflected by the first reflection portion 13 is guided toward the second emission portion 19 in the rear direction inside the first light guide portion 41.

In between the first incidence portion 11 and the second incidence portion 12 of the first light guide portion 41, a recess portion 43 formed by making a notch in a part of a lower side of the first light guide portion 41 in the left-right direction, and a front-side light guide emission surface 43*a* and a rear-side light guide incident surface 43*b* which are facing each other in the front-rear direction of the first light guide portion 41 while having a space K, which is formed by the recess portion 43, between the front-side light guide emission surface 43*a* and the rear-side light guide incident surface 43*b*.

The first light L1 reflected by the first reflection portion 13 is emitted from the light guide emission surface 43*a* to the space K, and then enters the inner side of the first light guide portion 41 from the light guide incident surface 43*b* via the space K.

Furthermore, a plurality of diffusion cuts 43*c* for diffusing the first light L1, which enters from the light guide incident surface 43*b*, in the up-down direction are provided on the light guide incident surface 43*b*. The diffusion cuts 43*c* is constituted with a plurality of flute cuts in which an approximately cross-sectional arc-shaped groove portion that makes a notch in the light guide incident surface 43*b* in the left-right direction is arranged in the up-down direction.

Thereby, the first light L1 entered the inner side of the first light guide portion 41 from the light guide incident surface 43*b* is diffused in the up-down direction by the plurality of diffusion cuts 43*c*, and is guided inside the first light guide portion 41 toward the second emission portion 19 located in the rear direction.

The second reflection portion 14 is positioned on a side of the first light guide portion 41 which is opposite side of the first incidence portion 11 and has a second reflection surface 14*a* configured to reflect a part of the first light L1 entered from the first incidence portion 11 toward the front end side of the first light guide portion 41. The second reflection surface 14*a* is formed of a flat inclined surface that inclines upward as it goes toward the front side of the first light guide portion 41.

In the second reflection portion 14, a part of the first light L1 incident on the second reflection surface 14*a* is reflected toward the front end side of the first light guide portion 41. The first light L1 reflected by the second reflection portion 14 is guided inside the first light guide portion 41 toward the third reflection portion 15 located in the front direction.

The third reflection portion 15 is positioned on the front end side of the first light guide portion 41 and has a third reflection surface 15*a* configured to reflect the first light L1 reflected by the second reflection portion 14 toward the second light guide portion 42. The third reflection surface 15*a* includes a flat inclined surface that inclines upward as it goes toward the front side of the second light guide portion 42.

In the third reflection portion 15, the first light L1 incident on the third reflection surface 15*a* is reflected toward the second light guide portion 42 located in the upper direction. The first light L1 reflected by the third reflection portion 15 is guided inside the second light guide portion 42 toward the fourth reflection portion 16 located in the up direction.

The fourth reflection portion 16 has a plurality of reflection cuts 16*a* on the rear surface 42*a* side of the second light guide portion 42. Moreover, the rear surface 42*a* of the second light guide portion 42 includes an inclined surface that is concavely curved rearward as it extends upward.

It is only necessary for the plurality of reflection cuts 16*a* to reflect the first light L1 incident on the rear surface 42*a* of the second light guide portion 42 at an angle at which the light is emitted (transmitted) outward from the first emission portion 17 provided on the front surface 42*b* side of the second light guide portion 42, and the plurality of reflection cuts 16*a* are not particularly limited in shape, size, number, or the like.

For example, in the present embodiment, the plurality of reflection cuts 16*a* are configured so that an approximately cross-sectional arc-shaped groove portion that makes a notch in the rear surface 42*a* of the second light guide portion 42 in the left-right direction is arranged in the up-down direction of the second light guide portion 42.

Moreover, the plurality of reflection cuts 16*a* may be formed to gradually decrease the spacing between adjacent groove portions that form the reflection cuts 16*a* from the lower end side to the upper end side of the second light guide portion 42 so that light is emitted more uniformly in a first light emission range E1 to be described below. Alternatively, the depth of the groove portions forming the reflection cuts 16*a* may gradually increase.

In the fourth reflection portion 16, the first light L1 incident on the rear surface 42*a* of the second light guide portion 42 is reflected by the plurality of reflection cuts 16*a* toward the first emission portion 17 located in the rear direction. The first light L1 reflected by the fourth reflection portion 16 is guided inside the second light guide portion 42 toward the first emission portion 17 located in the front direction.

The first emission portion 17 has a flat first emission surface 17*a* on the front surface 42*b* side of the second light guide portion 42. The first emission surface 17*a* is a part of the front surface 42*b* of the second light guide portion 42 and is provided on the side opposite to the fourth reflection portion 16 of the second light guide portion 42 in a range overlapping the plurality of reflection cuts 16*a* in the front view.

In the first emission portion 17, the first light L1 reflected by the fourth reflection portion 16 is emitted to the outer side of the second light guide portion 42 from the first emission surface 17*a*. The first light L1 emitted from the first emission portion 17 is radiated toward the third inner lens 6 in the front direction.

The fifth reflection portion 18 is positioned on the side of the first light guide portion 41 opposite to the second incidence portion 12 and has a fifth reflection surface 18*a* configured to reflect the second light L2 entered from the second incidence portion 12 toward the other end side of the first light guide portion 41. The fifth reflection surface 18*a* includes a flat inclined surface that inclines upward toward the rear side of the first light guide portion 41.

In the fifth reflection portion 18, a part of the second light L2 incident on the fifth reflection surface 18*a* is reflected toward a distal end side of the first light guide portion 41. The second light L2 reflected by the fifth reflection portion 18 is guided inside the first light guide portion 41 toward the second emission portion 19 located in the rear direction.

The second emission portion 19 has a second emission surface 19*a* on the rear end side of the first light guide portion 41. The second emission surface 19*a* includes a flat surface of the second light guide portion 42.

In the second emission portion 19, the second light L2 reflected by the fifth reflection portion 18 and the first light L1 reflected by the first reflection portion 13 are emitted to the outer side of the first light guide portion 41 from the second emission surface 19*a*. The second light L2 and the first light L1 emitted from the second emission portion 19 are radiated toward the third inner lens 6 located in the rear direction.

As shown in FIGS. 2 to 5 and FIG. 7, the second inner lens 5 is made of a light-transmissive member such as glass or a transparent resin of polycarbonate, acrylic, or the like. The second inner lens 5, serving as a second light guide body, is arranged inside a recess portion 44 provided on the upper side of the first inner lens 4.

The recess portion 44 forms a recess portion sufficient to accommodate the second inner lens 5, extending between the first reflection portion 13 and the fifth reflection portion 18 of the first light guide portion 41. That is, the second inner lens 5 is arranged inside the recess portion 44, such that the second inner lens 5 is arranged below the lower end of the first emission portion 17 and the upper end of the second emission portion 19 in front view.

The second inner lens 5 is fixed to the first inner lens 4 by a fastening member such as a screw or a hook (not shown).

The second inner lens 5 has a plurality of light guide portions 5*a* arranged in the left-right direction and a plurality of connection portions 5*b* that connect spaces between adjacent light guide portions 5*a* in correspondence with the above-described light source portions 30. Each light guide portion 5*a* extends from the front end side to the rear end side of the second inner lens 5 in the front-rear direction.

Moreover, in the vehicle lamp 1 viewed from the rear side of the vehicle, for each light source portion 30, the plurality of light guide portions 5*a* are arranged to be located in more front side of the vehicle as it goes from the left side to the right side in the left-right direction. The plurality of connection portions 5*b* connect spaces between the adjacent light guide portions 5*a*.

The second inner lens 5 has, for each light guide portion 5*a*, a third incidence portion 20 positioned on the lower side of the light guide portion 5*a*, a sixth reflection portion 21 positioned on the upper side of the light guide portion 5*a*, a seventh reflection portion 22 positioned on the lower side of the light guide portion 5*a* and the rear side of the third incidence portion 20, and a third emission portion 23 positioned on the upper side of the light guide portion 5*a* and the rear side of the sixth reflection portion 21.

The third incidence portion 20 has a flat third incident surface 20*a* facing and extending across at least a space between the first reflection surface 13*a* and the second reflection surface 14*a* of the first light guide portion 41.

On the other hand, a connection surface 41*a* that establishes a connection between the first reflection surface 13*a* and the second reflection surface 14*a* in the up-down direction is provided in the first light guide portion 41. Moreover, a groove portion 41*b* having an approximately triangular cross-section is formed between the connection surface 41*a* and the second reflection surface 14*a*. The bottom of the groove portion 41*b* is curved and the first light L1 leaking from this portion to the outer side of the first light guide portion 41 is referred to as third light L3.

In the third incidence portion 20, the third light L3 leaking from the groove portion 41*b* of the first light guide portion 41 enters the inner side of the light guide portion 5*a* from the third incident surface 20*a*. The third light L3 entered from the third incidence portion 20 is guided toward the sixth reflection portion 21 in the up direction inside the light guide portion 5*a*.

The sixth reflection portion 21 is positioned on a side of the light guide portion 5*a* which is opposite side of the third incidence portion 20 and has a sixth reflection surface 21*a* configured to reflect the third light L3 entered from the third incidence portion 20 toward the rear end side of the light guide portion 5*a*. The sixth reflection surface 21*a* includes a flat inclined surface that inclines upward as it goes toward the rear side of the light guide portion 5*a*.

In the sixth reflection portion 21, the third light L3 incident on the sixth reflection surface 21*a* is reflected toward the distal end side of the light guide portion 5*a*. The third light L3 reflected by the sixth reflection portion 21 is guided inside the light guide portion 5*a* toward the seventh reflection portion 22 located on the other side in the first direction.

The seventh reflection portion 22 has an inclined surface 22*a* provided on the lower surface of the light guide portion 5*a*, and a plurality of reflection cuts 22*b* formed on the inclined surface 22*a*. The inclined surface 22*a* inclines upward as it goes toward the rear side of the light guide portion 5*a*.

It is only necessary for the plurality of reflection cuts 22*b* to reflect the third light L3 incident on the inclined surface 22*a* at an angle at which the light is emitted (transmitted) outward from the third emission portion 23 provided on the upper side of the light guide portion 5*a*, and the plurality of reflection cuts 22*b* are not particularly limited in shape, size, number, or the like.

For example, in the present embodiment, the plurality of reflection cuts 22*b* are configured so that an approximately cross-sectional triangular groove portion that makes a notch in the inclined surface 22*a* in the left-right direction of the light guide portion 5*a* is arranged in the front-rear direction of the light guide portion 5*a*.

Moreover, the plurality of reflection cuts 22*b* may be configured to gradually decrease the spacing between adjacent groove portions forming the reflection cuts 22*b* from the front end side to the rear end side of the light guide portion 5*a* so that light is emitted more uniformly in the second light emission range E2 to be described below. Alternatively, the depth of the groove portion forming the reflection cut 22*b* may gradually increase.

In the seventh reflection portion 22, the third light L3 incident on the inclined surface 22*a* is reflected toward the third emission portion 23 in an obliquely upward direction by the plurality of reflection cuts 22*b*. The third light L3 reflected by the seventh reflection portion 22 is guided inside the light guide portion 5*a* toward the third emission portion 23.

The third emission portion 23 has a flat third emission surface 23*a* on the upper side of the light guide portion 5*a*. The third emission surface 23*a* is a part of the front surface of the light guide portion 5*a*, and is provided on a side opposite to the seventh reflection portion 22 of the light guide portion 5*a* in a range overlapping the plurality of reflection cuts 22*b* in top view.

In the third emission portion 23, the third light L3 reflected by the seventh reflection portion 22 is emitted from the third emission surface 23*a* to the outer side of the light guide portion 5*a*. The third light L3 emitted from the third emission portion 23 is radiated toward the third inner lens 6 in an obliquely upward direction.

As shown in FIGS. 2 to 5 and FIG. 8, the third inner lens 6 is made of a light-transmissive member such as glass or a transparent resin (e.g., polycarbonate or acrylic). As the third light guide body, the third inner lens 6 is arranged to cover the front side of the first inner lens 4 facing the first emission portion 17 and the second emission portion 19.

The third inner lens 6 has a plurality of lens portions 6*a* arranged in the left-right direction in correspondence with the above-described light source portions 30, and a plurality of connection portions 6*b* connecting spaces between adjacent lens portions 6*a*. Moreover, in the vehicle lamp 1 viewed in the rear direction of the vehicle, for each light source portion 30, the plurality of lens portions 6*a* are arranged to be located in more front side of the vehicle as it goes from the left side to the right side in the left-right direction. The plurality of connection portions 6*b* connect the spaces between adjacent lens portions 6*a*.

In the third inner lens 6, the first to third light L1 to L3 entered from the rear side to the inner side of the lens portions 6*a* is emitted to the outer side from the front side of the lens portions 6*a*. Thereby, the front side of the third inner lens 6 can be made to emit red light.

Specifically, the third inner lens 6 includes the first light emission range E1 in which light emission is performed by the first light L1 emitted from the first emission portion 17 and the third light L3 emitted from the third emission portion 23 and the second light emission range E2 in which light emission is performed by the second light L2 emitted from the second emission portion 19 and the first light L1. Moreover, the first light emission range E1 and the second light emission range E2 form a light emission range E continuous in the up-down direction of the third inner lens.

The lens portions 6*a* include a first lens portion 61 corresponding to the first light emission range E1 and a second lens portion 62 corresponding to the second light emission range E2. The first lens portion 61 extends to the rear side of the third inner lens 6 in a direction inclined downward. On the other hand, the second lens portion 62 continuously extends below the first lens portion 61 in the up-down direction.

Moreover, on the front side of the second lens portion 62, a diffusion cut 62*a* is provided to diffuse while transmitting the second light L2 and the first light L1 emitted from the second light emission range E2.

Examples of the diffusion cut 62*a* include lens cuts called flute cuts or fish-eye cuts, irregular structures formed by performing knurling, embossing, or the like, and the like.

Moreover, it is possible to control a degree of diffusion of the second light L2 and the first light L1 emitted from the second light emission range E2 by adjusting the shape and the like of the diffusion cut 62*a*.

As shown in FIGS. 1 to 3, the extension 7 is made of a light-shielding member such as black resin. The extension 7 covers the front side of the third inner lens 6 (not shown) and has a plurality of openings 7*a*.

A plurality of openings 7*a* are provided with openings in a shape corresponding to the light emission range E for each lens portion 6*a* of the third inner lens 6. Thereby, the light emission range E of each lens portion 6*a* of the third inner lens 6 is arranged to face outward from the respective opening 7*a* of the extension 7.

The extension 7 shields leakage light from the front side of the third inner lens 6 by covering regions other than the light emission range E of each lens portion 6*a* of the third inner lens 6. Moreover, the extension 7 serves an aesthetic role for the vehicle lamp 1.

In addition, the extension 7 is not necessarily an essential configuration and can be omitted. Moreover, a configuration in which a light-shield member such as a bezel or a light-shielding layer is arranged on the front side of the third inner lens 6 may be employed instead of the extension 7.

In the vehicle lamp 1 of the present embodiment having the above configuration, when the tail lamp TAIL shown in FIG. 4 is turned on, the first light source 3A is turned on. Thereby, red-light emission in the first light emission range E1 is performed by the first light L1 emitted from the first emission portion 17 and the third light L3 emitted from the third emission portion 23 and red-light emission in the second light emission range E2 is performed by the first light L1 emitted from the second emission portion 19.

Accordingly, when the tail lamp TAIL is turned on, red-light emission can be performed using the first light emission range E1 and the second light emission range E2 as the light emission range E continuous in the up-down direction.

On the other hand, in the vehicle lamp 1 of the present embodiment, when the stop lamp STOP shown in FIG. 5 is turned on, the first light source 3A and the second light source 3B are turned on. Thereby, red-light emission in the first light emission range E1 is performed by the first light L1 emitted from the first emission portion 17 and the third light L3 emitted from the third emission portion 23 and red-light emission in the second light emission range E2 is performed by the second light L2 emitted from the second emission portion 19 and the first light L1.

Accordingly, when the stop lamp STOP is turned on, red-light emission can be performed using the first light emission range E1 and the second light emission range E2 as the light emission range E continuous in the up-down direction and it is possible to emit red light more intensely (brightly) than when the tail lamp TAIL is turned on in the second light emission range E2.

As described above, in the vehicle lamp 1 of the present embodiment, it is possible to enlarge the light emission range E including the first light emission range E1 and the second light emission range E2 continuous in the above-described up-down direction. Moreover, in this light emission range E, it is possible to emit light more intensely (brightly) in the second light emission range E2 than in the first light emission range E1.

Moreover, in the vehicle lamp 1 of the present embodiment, by using the above-described second inner lens 5, it is possible to utilize the third light L3 leaking out from the upper surface of the first inner lens 4 for light emission in the first light emission range E1. Thereby, it is possible to enhance the utilization efficiency of the first light L1 emitted from the first light source 3A. Moreover, by superimposing the first light L1 emitted from the first emission portion 17 and the third light L3 emitted from the third emission portion 23, it is possible to emit light more uniformly in the first light emission range E1.

In addition, the present invention is not necessarily limited to the above-described embodiment, and various modifications can be made without departing from the scope of the present invention.

Although the plurality of light guide portions 4*a* and 5*a* and the lens portion 6*a* in the first to third inner lenses 4, 5, and 6 are configured to be connected via the plurality of connection portions 4*b*, 5*b*, and 6*b* in correspondence with the above described plurality of light source portions 30 in the above-described vehicle lamp 1, the plurality of connection portions 4*b*, 5*b*, and 6*b* may be omitted, the plurality of light guide portions 4*a* and 5*a* and the lens portion 6*a* may constitute a single continuous light guide portion 4*a* or 5*a* and the lens portion 6*a* extending in the left-right direction or may be configured to be divided into the plurality of light guide portions 4*a* and 5*a* and the lens portion 6*a*.

Although a configuration in which the above-described tail lamp TAIL and stop lamp STOP emit light is exemplified as the vehicle lamp 1 mounted on both corner portions on the rear end side of a vehicle in the above-described embodiment, the present invention can also be applied to a configuration in which a tail lamp and a turn lamp emitting orange light by blinking, or a back lamp emitting white light, emit light.

Moreover, the present invention can also be applied to a configuration in which a position lamp or daytime running lamp (DRL) and a turn lamp for emitting white light emit light as a vehicle lamp mounted on both corner portions on the front end side of the vehicle.

Moreover, the colors of the first light L1 and the second light L2 emitted by the first light source 3A and the second light source 3B described above, respectively, may be appropriately changed to red light, white light, orange light, or the like in accordance with the application.

What is claimed is:

1. A vehicle lamp comprising:

a first light source that is provided on one side in a first direction and that is configured to emit first light toward other side in a second direction which intersects the first direction;

a second light source that is provided on other side in the first direction and that is configured to emit second light toward the other side in the second direction;

a first light guide body provided on a side facing the first light source and the second light source; and a second light guide body provided on a side opposite to the side of the first light guide body facing the first light source and the second light source, wherein the first light guide body includes:

a first light guide portion extending in the first direction;

a second light guide portion extending from one end side of the first light guide portion toward the other side in the second direction;

a first incidence portion that is positioned on a side of the first light guide portion which faces the first light source and that is configured to cause the first light emitted from the first light source to enter inside of the first light guide portion;

a second incidence portion that is positioned on a side of the first light guide portion which faces the second light source and that is configured to cause the second light emitted from the second light source to enter inside of the first light guide portion;

a first reflection portion that is positioned on a side of the first light guide portion which is opposite to the first incidence portion and that is configured to reflect a part of the first light which has entered from the first incidence portion toward the other end side of the first light guide portion;

a second reflection portion that is positioned on the side of the first light guide portion which is opposite to the first incidence portion and that is configured to reflect a part of the first light which has entered from the first incidence portion toward the one end side of the first light guide portion;

a third reflection portion that is positioned on the one end side of the first light guide portion and that is configured to reflect the first light reflected by the second reflection portion toward the second light guide portion;

a fourth reflection portion that is positioned on one side of the second light guide portion in the first direction and that is configured to reflect the first light which is guided inside the second light guide portion toward the other side in the first direction;

a first emission portion that is positioned on a side of the second light guide portion which is opposite to the fourth reflection portion and that is configured to emit the first light reflected by the fourth reflection portion to an outer side of the second light guide portion;

a fifth reflection portion that is positioned on a side of the first light guide portion which is opposite to the second incidence portion and that is configured to reflect the second light entered from the second incidence portion toward the other end side of the first light guide portion; and a second emission portion that is positioned on the other end side of the first light guide portion and that is configured to emit the second light reflected by the fifth reflection portion and the first light reflected by the first reflection portion to an outer side of the first light guide portion, and wherein the second light guide body includes:

a third incidence portion that is positioned on a side facing the first light guide portion and that is configured to cause third light leaked from the first light guide portion to enter inside of the second light guide body; and a third emission portion that is positioned on a side opposite to the third incidence portion and that is configured to emit the third light entered from the third incidence portion to an outer side of the second light guide body.

2. The vehicle lamp according to claim 1, further comprising a third light guide body provided on a side facing the first emission portion and the second emission portion, wherein the third light guide body includes:

a first light emission range in which light emission is performed by the first light emitted from the first emission portion and the third light emitted from the third emission portion; and a second light emission range in which light emission is performed by the second light emitted from the second emission portion and the first light, and wherein the first light emission range and the second light emission range form a light emission range continuous in the second direction.

3. The vehicle lamp according to claim 1, wherein the second light guide body is arranged inside a recess portion provided on a side opposite to the side facing the first light source and the second light source of the first light guide body.

4. The vehicle lamp according to claim 1, wherein the third incidence portion is provided facing at least a space between the first reflection portion and the second reflection portion of the first light guide portion.

5. The vehicle lamp according to claim 4, wherein the second light guide body includes:

a sixth reflection portion that is positioned on a side opposite to the third incidence portion and on one side of the third emission portion in the first direction and that is configured to reflect the third light entered from the third incidence portion toward the other side in the first direction; and a seventh reflection portion that is positioned on the side facing the first light guide portion and on the other side in the first direction than the third incidence portion and that is configured to reflect the third light reflected by the sixth reflection portion toward the third emission portion.

6. The vehicle lamp according to claim 1, wherein the second light guide portion has a shape in which one surface where the fourth reflection portion is provided is inclined toward the other side in the first direction and the other surface where the first emission portion is provided is inclined toward one side in the first direction.

7. The vehicle lamp according to claim 1, wherein the first incidence portion and the second incidence portion have lens shapes in which the first light and the second light emitted from the first light source and the second light source enter the inside of the first light guide portion while condensing the first light and the second light emitted from the first light source and the second light source toward an optical axis.

8. The vehicle lamp according to claim 1, wherein the first reflection portion, the second reflection portion, the third reflection portion, and the fifth reflection portion include inclined surfaces, and wherein the fourth reflection portion includes a plurality of reflection cuts.

9. The vehicle lamp according to claim 5, wherein the sixth reflection portion includes an inclined surface, and wherein the seventh reflection portion includes a plurality of reflection cuts.

* * * * *